United States Patent [19]

Karidis

[11] Patent Number: 4,487,075
[45] Date of Patent: Dec. 11, 1984

[54] HYDRAULIC FLOW VISUALIZATION METHOD AND APPARATUS

[75] Inventor: Peter G. Karidis, Mt. Lebanon, Pa.

[73] Assignee: The United States of America as represented by the United States Department of Energy, Washington, D.C.

[21] Appl. No.: 485,153

[22] Filed: Apr. 15, 1983

[51] Int. Cl.³ ............................................. G01F 1/70
[52] U.S. Cl. ...................... 73/861.05; 116/264; 356/23
[58] Field of Search ............... 73/861, 861.05, 861.07, 73/861.41, 147, 148; 116/264, 265, 273, 276; 356/23, 24, 27, 28

[56] References Cited

U.S. PATENT DOCUMENTS

| | | | |
|---|---|---|---|
| 1,960,735 | 5/1934 | Frank et al. | 73/189 |
| 2,967,450 | 1/1961 | Shields et al. | |
| 3,017,769 | 1/1962 | Orlin | |
| 3,336,803 | 8/1967 | Thorndike | 73/861.05 |
| 3,403,554 | 10/1968 | Chevalier et al. | |
| 3,907,429 | 9/1975 | Kuhn et al. | 73/861 X |
| 3,942,371 | 3/1976 | Bryer | |
| 4,084,432 | 4/1978 | Lecoffre | |

FOREIGN PATENT DOCUMENTS 497704 12/1938 United Kingdom ................. 356/24

OTHER PUBLICATIONS

"Optical Flowmeter"-Bulletin 22A of R. A. Morgan, Co.-2/1966.
"Flow Visualization", *Research/Development*, 8/1974, pp. 26-28.

*Primary Examiner*—Charles A. Ruehl
*Attorney, Agent, or Firm*—Michael F. Esposito

[57] ABSTRACT

An apparatus and method for visualizing liquid flow. Pulses of gas bubbles are introduced into a liquid flow stream and a strobe light is operated at a frequency related to the frequency of the gas pulses to shine on the bubbles as they pass through the liquid stream. The gas pulses pass through a probe body having a valve element, and a reciprocating valve stem passes through the probe body to operate the valve element. A stem actuating device comprises a slidable reciprocating member, operated by a crank arm. The actuated member is adjustable to adjust the amount of the valve opening during each pulse.

14 Claims, 6 Drawing Figures

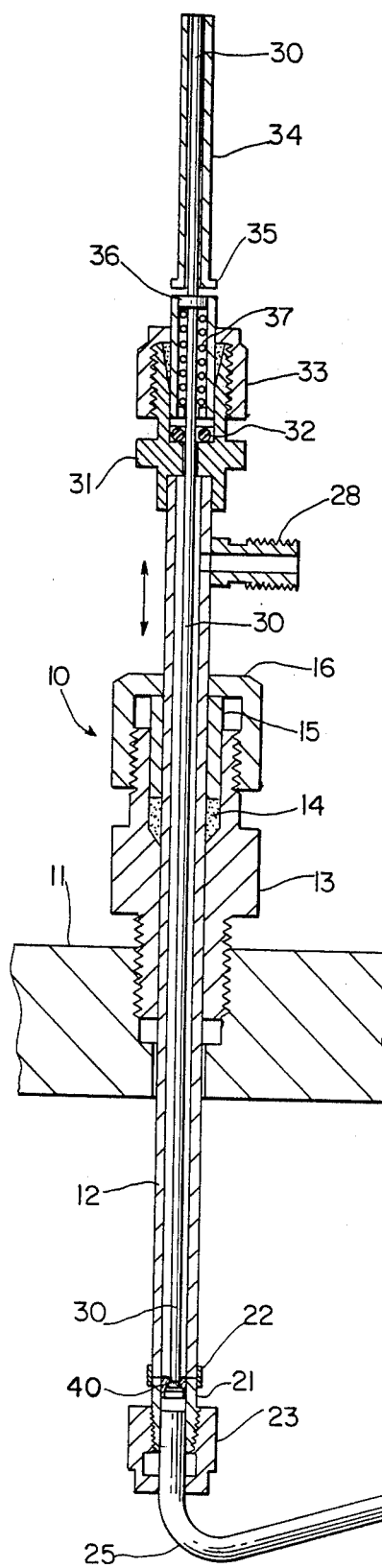
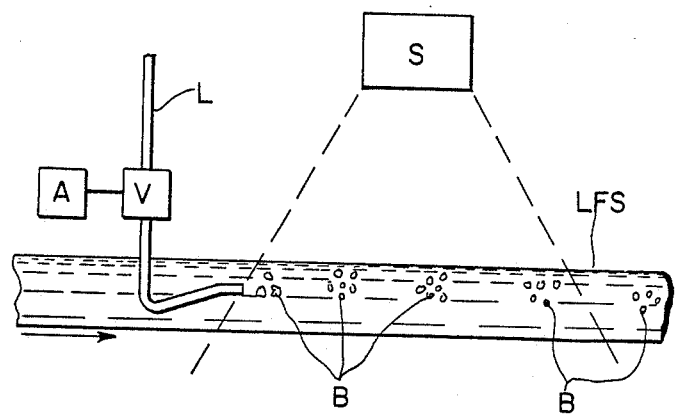
FIG. 1
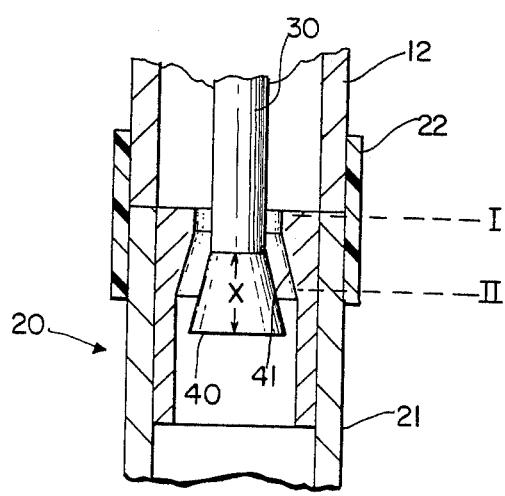
FIG. 3
FIG. 2

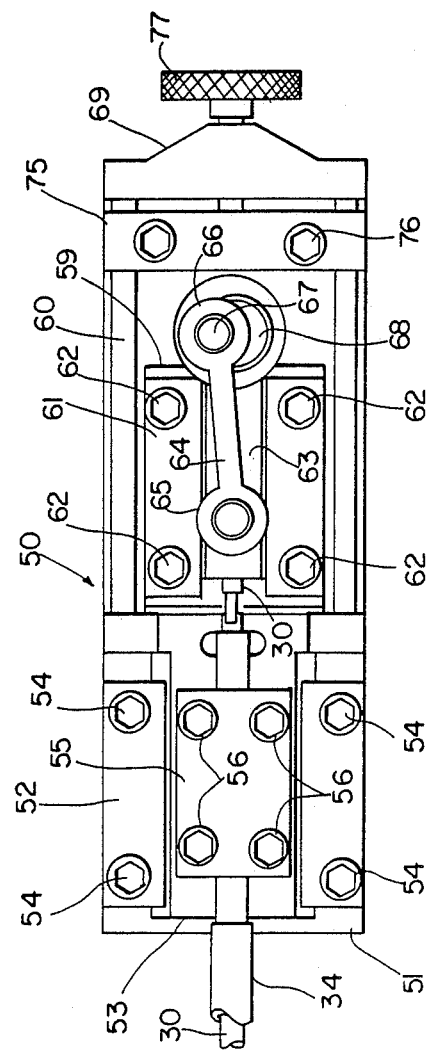
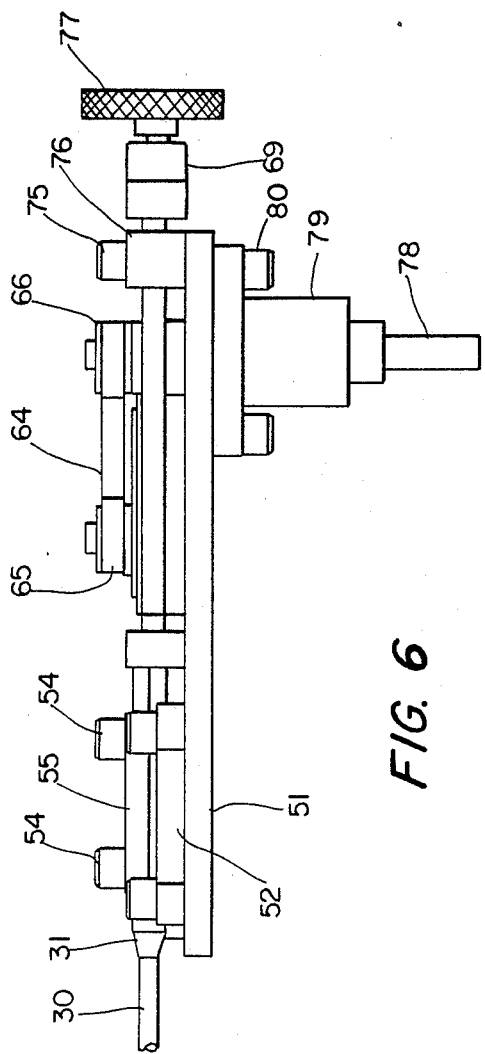
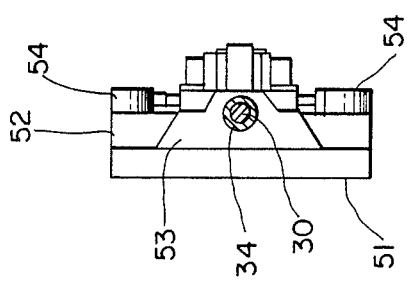
FIG. 4
FIG. 6
FIG. 5

HYDRAULIC FLOW VISUALIZATION METHOD AND APPARATUS

BACKGROUND OF THE INVENTION

This invention relates to visualizing and observing hydraulic flow conditions in a liquid flow stream; and in particular, it relates to a new and improved method and apparatus for accomplishing same.

Heretofore, techniques for observing hydraulic flow conditions have utilized introduction of air bubbles, plastic pellets, aluminum flakes, and the like, into the liquid flow streams. Photographic means have been used for recording and studying movement of the introduced ingredient. At low flow stream velocities, prior techniques have permitted fairly direct estimates of the liquid flow velocity, essentially by direct visual observation. However, above very low velocities, these techniques do not permit direct estimates of velocities by visual observation, and moreover they do not lend themselves to determining velocity by recording techniques such as videotape recording systems. Motion picture photography has also been used in the past. However, this procedure is very time consuming and obtaining meaningful results requires the tedious task of studying the film, frame by frame. When using the solid substances such as plastic pellets, aluminum flakes or the like, these had the advantage of providing greater visibility. However, these have the disadvantage that it is virtually impossible to clean the test loop to remove these solid substances and hence they cannot be used for tests requiring pure water.

Examples of prior patents which utilize gas bubbles in liquid for different purposes includes U.S. Pat. Nos. 2,967,450; 3,403,554; 3,942,371 and 4,084,432.

Hence, there exists a need for a technique which will allow improved direct observation of liquid flow conditions, including both direction and velocity.

SUMMARY OF THE INVENTION

It is a purpose of the present invention to provide a new and improved method and apparatus which will allow improved direct observation of hydraulic flow conditions.

This purpose of the present invention is achieved by introducing pulses of gas bubbles into the liquid flow stream and illuminating the portion of the liquid flow stream containing the injected gas bubbles with a strobe light operating at a frequency and/or phase related to the frequency and/or phase of the pulse gas bubble injection.

In accordance with a preferred method of the present invention, the pulses of gas bubbles are introduced into the flow stream at a predetermined frequency. Each pulse will provide a clustered group of gas bubbles. After a plurality of pulses, the groups of gas bubbles will be spaced from each other in the direction of flow. This section of the liquid flow stream is illumined by a strobe light. If the strobe light operates at the same frequency as that at which the gas bubbles are introduced, then the groups of gas bubbles will appear to be stationary, and the distance between them will represent the velocity of the liquid flow stream.

In accordance with a preferred apparatus of the present invention, a new and improved probe body is provided for introducing the pulses of gas bubbles into the stream. The probe body is adapted to pass through a boundary of the fluid flow stream and it includes an elongated probe which provides for the passage of a gas from outside of the flowstream, therethrough to the interior of the flow stream. The probe body includes a valve means therein, means for introducing a gas upstream from this valve, and an actuator means for opening and closing the valve means at the predetermined frequency.

In accordance with a preferred arrangement, the probe body is formed as an elongated tube and the valve means comprises a poppet valve. The actuator means is attached to a valve stem which extends through the probe tube and is connected to the poppet valve to periodically open the same, and an actuator means for reciprocating the valve stem at the desired frequency to in turn open and close the valve at the desired frequency. In a preferred arrangement, the valve stem would be spring biased to a valve closed position. The actuator means would then move the valve stem causing the valve to open.

The valve stem actuator means can take many forms including electronic means, electro-mechanical means such as solenoid, or mechanical means such as reciprocating slide member.

A preferred form of mechanical means may include a reciprocating slide member which contacts the valve stem during part of the reciprocation stroke and opens the valve. In accordance with a preferred arrangement, a crank arm may be provided which is rotated by eccentric means at one of its ends such that the other end, being confined to linear movement in the direction of reciprocation, reciprocates the sliding member and hence moves the valve stem at the end of the reciprocating stroke. Means may be provided for adjusting the position of the reciprocating slide member relative to the probe body to alter the open positions of the valve. This will in turn vary the extent to which the valve opens during each pulse; and this, of course, will determine the amount of gas introduced during each pulse.

Hence, it is a purpose of the present invention to provide a new and improved method and apparatus for improving direct observation of liquid flow conditions.

It is another object of the present invention to provide a new and improved method and apparatus for observing liquid flow conditions, according to which pulses of gas are introduced into the liquid flow stream and these pulses are illumined by a strobe light operating at a frequency related to the frequency of the gas pulses.

It is still another object of this invention to provide a new and improved probe body for introducing gas pulses into a liquid flow stream.

It is still another object of this invention to provide a new and improved actuator means for actuating the probe body to introduce the gas pulses into the liquid stream.

These and other objects of the present invention will become apparent from the detailed description to follow.

BRIEF DESCRIPTION OF THE DRAWINGS

There follows a detailed description of preferred embodiments of the present invention, to be read together with the accompanying drawings in which:

FIG. 1 is a schematic view illustrating the operation of the present invention.

FIG. 2 is a central cross sectional view of a probe body, made in accordance with the present invention, mounted on the boundary of a liquid flow stream.

FIG. 3 is an enlarged central cross sectional view of the valve portion of FIG. 2.

FIG. 4 is a plan view of an actuator means to be used with the probe body of FIG. 2.

FIG. 5 is a left end view of FIG. 4.

FIG. 6 is a front elevational view of FIG. 4.

DETAILED DESCRIPTION OF THE PREFERRED EMBODIMENTS

Referring now to the drawings, like elements are represented by like numerals throughout the several views.

Referring to a schematic FIG. 1; LFS represents the liquid flow stream containing the hydraulic flow to be visualized. Air through the flow line L is permitted to be introduced via valve V into the stream to form groups of gas bubbles B. Opening and closing of the valve is controlled by actuator means A. With the strobe light S illuminating the bubbles at the same frequency as they are introduced, for example 15 Hertz, the groups of gas bubbles would appear stationary, and since their injection rate is known to be 1/15 of a second, the distance between them will represent the distance travelled by the respective groups in 1/15 of a second. With the strobe light maintained at 15 Hertz, if the injection frequency is increased above 15 Hertz, the groups of bubbles will appear to move slowly downstream. At 16 Hertz injection frequency, with 15 Hertz strobe frequency, an apparent bubble velocity of 1" per second corresponds to an actual flow stream velocity of 1.33 feet per second.

In practice, illumination of bubbles (as opposed to illumination of solid objects) requires that a bubble be illuminated from many directions. It has been found that under darkened room conditions four strobes fired simultaneously with a white background provide optimum results. It is also preferable to use wide parabolic reflectors with rough surface configurations to scatter the light and achieve the effect of light rays arriving from many directions.

FIGS. 2 and 3 illustrate the probe body. The probe body 10 passes through the boundary 11 of the liquid flow stream. The probe body includes an elongated probe tube 12 which is supported at the boundary wall 11 by a seal gland 13 which houses a seal 14, held therein by a sleeve 15, all of which is held in place by a cap 16 threadedly engaged to the exterior of gland 13 so as to force sleeve 15 against the seal 14.

Mounted at the lower end of probe tube 12 is a poppet valve 20 (representing the valve V of FIG. 1). To provide for mounting of this valve, the tube 12 ends in the vicinity of valve 20. The probe tube 12 is extended at its lower end by a lower extension 21. An exterior joint seal 22 provides a fluid tight connection between probe tube 12 and lower extension 21. A lower fitting 23 is secured to the lower end of extension 21, and the nozzle 24 extends from lower extension 21, through the lower fitting 23, below which it bends at right angle 25 to extend in the direction of flow so that the bubbles released through nozzle 24 will preferably be directed in the direction of flow.

It will be observed that probe tube 12 is slidable within the seal gland 13 so that the vertical position of nozzle 24 within the liquid flow stream can be varied. Also, the probe tube 12 can be rotated within seal gland 13 to bring the outlet of the nozzle to different lateral positions.

Above the seal gland 13 there is provided a gas inlet 28 for introducing gas into the probe tube 12, which gas will of course be introduced through the valve 20 and into the liquid flow stream.

A valve stem 30 connected at its lower end to the poppet valve extends upwardly therefrom completely through the probe body 10. Above the gas inlet 28 the probe tube 12 ends and is enclosed by an upper fitting 31 secured thereto and has an opening there-through for the valve stem 30. Within this upper fitting 31 there is provided an O-ring seal 32 to prevent the gas from passing upwardly through the upper fitting 31. The upper portion of fitting 31 includes a threaded portion, to which is attached an upper cap 33. Starting within the upper portion of upper fitting 31, there is provided an upper tube 34 which, above the cap 33, becomes reduced in cross section. A flange 36 is formed integrally with the valve stem 30. A spring 37, which at its lower end acts against fitting 31, acts at its upper end against flange 36, urging the valve poppet 40 against valve seat 41. This moves the valve stem to the valve closed position.

The valve itself is shown in an enlarged view in FIG. 3. The valve is a poppet valve having an enlarged valve element 40 which fits against a seat 41. Also shown in FIG. 3 are the elements 12, 22 and lower extension 21. The opening of the valve can be varied in size during each pulse (by means to be described in greater detail below). Referring for example to FIG. 3, if the stroke of the valve is represented by the dimension X and the two lines I and II represent the range of adjustment of the upper end position of the poppet valve element 40 during each stroke, then the opening of the valve during each pulse will be varied, with the minimum opening occurring when the upper position of element 40 is at line I, and the maximum opening occurring when the upper end position of element 30 is at line II.

Referring now to FIGS. 4 through 6, there is illustrated the valve actuator 50 (corresponding to element A in FIG. 1). This mechanism reciprocates the valve steam for each pulse and it also provides means for adjusting the position of valve element 40, as between the lines I and II of FIG. 3, so as to adjust the magnitude of the valve opening during each pulse.

Referring now to FIGS. 4 through 6, the valve actuator 50 comprises a main frame 51. The left hand end, which secures the upper tube 34, comprises a pair of slide track members 52 which receive beneath the upper portion thereof a clamp central lower member 53, the elements 52 being secured to element 53 by suitable bolts 54 which at their lower ends are secured in the main frame 51. A clamp central upper member 55 is spaced above the lower member 53 and the upper tube 34 is held in place between elements 55 and 54, which two elements are secured together by means of bolts 56. The clamp central lower member 53 is connected to an end member 69 by two tie rods 60.

The right hand portion of the valve actuator 50 comprises means for engaging and reciprocating the valve stem 30. The main frame 51 has mounted thereon a mounting plate 59 and a slide track 61. Bolts 62 secure the slide track 61 and mounting plate 59 to the main frame 51. A reciprocating member 63 is received within a central recess of the fixed slide track 61. A valve activating projection is fixed to this reciprocating member 63 and in turn contacts the valve stem 30 at the end of each reciprocating stroke to open the valve.

A crank arm 64 is connected at its left end 65 to the reciprocating member 63. At its right hand end 66, the crank arm is mounted on a pin 67 which is eccentrically mounted on a fitting 68 at the upper end of a flexible drive shaft 78 which rotates within a bearing housing 79 fastened to the main frame 51 by bolts 80 (see in particular FIG. 6). Hence, in operation rotation of the flexible drive shaft 78 turns the fitting 68 which in turn causes the pin 67 and hence the right hand end of the crank arm 64 to follow a circular path. This in turn causes the left hand end 65 of the crank arm to reciprocate the member 63 within the track 61.

The end member 69 is fixed to the two tie rods 60, and hence fixed to the clamp members 55 and 53. Mounted to the left thereof is a cross member 75 which is secured by bolts 76 to the main frame 51. A thumb screw 77 is journalled within the end member 69 so as to be contrained against axial movement. The left end of thumb screw 77 is threaded within the cross member 75. Hence, turning of the thumb screw 77 causes the clamp members 55 and 53 and the valve body clamped therein to move longitudinally relative to the reciprocating member 63. This movement will adjust the open position of valve stem 30 relative to the probe tube 12 and hence also with respect to the valve seat 41. Hence, turning the thumb screw 77 will adjust the upper end position of valve element 40 between its ranges, as indicated by lines I and II, thereby varying the magnitude of the valve opening during each pulse.

The method of operation of the present invention will be apparent from the preceeding discussion. However, to briefly summarize the method of operation, one will adjust the frequency of the pulses by setting the RPMs of drive shaft 78 (by means not shown). An example would be 15 Hertz. With the shaft 78 operating at the selected speed, the crank arm 62 will turn at this speed, thereby reciprocating elements 63 and hence also valve steam 30 at the preselected frequency. Gas introduced through the inlet fitting 28 and hence present throughout the length of probe tube 12 will then pass through the space between valve element 40 and its seat 41 each time that the valve stem 30 was moved to its lower position. As the pulses of gas enter the stream, they would tend to enter in groups of bubbles, as illustrated diagrammatically in FIG. 1, although it is also possible that a single bubble could be introduced during each pulse. Meanwhile, the area of the liquid flow stream containing the bubbles would be illuminated by the strobe lights operating at a frequency related to the frequency of the gas pulses. Ideally, the frequency would be the same, whereby the groups of gas bubbles would appear stationary and the distance between the respected groups would indicate the velocity of the flow stream. If the injection frequency is increased above the frequency of the strobe light, the bubbles would appear to move slowly downstream. This apparent velocity of the bubbles would again represent the velocity of the fluid stream. Alternatively, the strobe and gas pulse frequencies can remain the same but the phase relationship can be varied at will to manually move a fixed bubble group along the path of the liquid flow stream. In this case the angular phase shift required to move the stationary bubble a unit distance is an inverse measure of the actual velocity of the liquid flow stream.

While generally the strobe lights would be mounted exterior of a transparent liquid flow steam, it is also possible to mount the strobe lights in water tight housings within the liquid flow stream. This would provide even better illumination. Also, if the strobe lights are mounted in such water tight compartments within the liquid flow stream, the boundary of the liquid flow stream need not be transparent. Instead, suitable optical means can be provided for viewing the interior of the liquid flow stream.

Although the invention has been described in considerable detail with respect to preferred embodiments of the present invention, it will be apparent that the invention is capable of numerous modifications and variations, apparent to those skilled in the art, without departing from the spirit and scope of the invention.

I claim:

1. A method for visualizing liquid flow through an enclosed passageway, comprising the following steps:
   introducing pulses of gas bubbles into a flow stream of the liquid, the pulses being at a predetermined frequency,
   and shining a strobe light onto the flow stream in the vicinity where the pulses of gas bubbles have been introduced, the operating frequency of the strobe light being related to the frequency of the pulses of gas bubbles.

2. The method of claim 1, including varying the frequency of the strobe light relative to the frequency of the gas bubbles.

3. The method of claim 2, including varying the phase of the strobe light pulses relative to the gas bubble pulses, at the same frequency.

4. The method of claim 2, including operating the strobe light and the gas pulses at the same frequency.

5. An apparatus for visualizing conditions of a liquid flow stream through an enclosed passageway, comprising:
   a probe body adapted to penetrate in a fluid tight manner the boundary of the passageway, said probe body including a gas passage from outside of the boundary, through the probe body to an outlet located in the passageway, a valve means for controlling gas flow, and a valve actuator means for opening and closing said valve means at a predetermined frequency to introduce pulses of gas into the liquid flow stream at said predetermined frequency,
   and a strobe light for illuminating the gas bubbles at a frequency related to the frequency of the gas pulses.

6. An apparatus according to claim 5, said probe body comprising an elongated tube, the valve means comprising a valve element located in the tube, a gas inlet means upstream from the valve element, a valve stem passing through the probe to operate the valve element, and said valve actuator means comprising means for reciprocating the stem to open and close the valve means at the predetermined frequency.

7. An apparatus according to claim 6, said actuator means comprising a solenoid.

8. An apparatus according to claim 6, said actuator means comprising a reciprocating member connected to the stem, and a crank arm drivable by a drive shaft for reciprocating the reciprocating member.

9. An apparatus according to claim 8, said valve element being a poppet valve which is normally closed, and opened by movement of the stem toward the valve, and including means for varying the extent of opening of the valve by adjusting the end position of the reciprocating member.

10. An apparatus according to claim 6, including means for varying the extent of opening of the valve means during each cycle.

11. An apparatus according to claim 6, said probe body including mounting means for mounting the probe body on the boundary of the enclosed passageway in a fluid tight manner and so as to be rotatable and adjustably movable to a limited extent into and out of the boundary.

12. An apparatus according to claim 6, said probe body including a mounting means for mounting the probe body on the boundary of the enclosed passageway in a fluid tight manner, said stem operable to open the valve means upon movement towards the valve means, and said valve means being closable upon movement of the stem away from the valve means, and a spring normally urging the stem away from the valve means, permitting it to close, said actuator means opposing said spring.

13. An apparatus according to claim 12, said actuator means comprising a reciprocating member connected to the stem, and a drivable crank arm connected to the reciprocating member to reciprocate it upon rotational movement of the crank arm.

14. An apparatus according to claim 13, including means for varying the end positions of movement of the reciprocating member to vary the end positions of stem movement, and to thereby vary the extent to which the stem opens the valve during each stroke of the reciprocating member.

* * * * *